(12) United States Patent
Bendel et al.

(10) Patent No.: US 11,781,350 B2
(45) Date of Patent: Oct. 10, 2023

(54) EMERGENCY ACTUATING DEVICE FOR A MOVABLE PART OF A VEHICLE

(71) Applicant: Kiekert AG, Heiligenhaus (DE)

(72) Inventors: Thorsten Bendel, Oberhausen (DE);
Marco Eggert, Düsseldorf (DE);
Tobias Klocke, Solingen (DE); Daniel Koch, Essen (DE); Martin Lindmayer, Sulz a.N. (DE)

(73) Assignee: Kiekert AG, Heiligenhaus (DE)

( * ) Notice: Subject to any disclaimer, the term of this patent is extended or adjusted under 35 U.S.C. 154(b) by 592 days.

(21) Appl. No.: 16/760,958

(22) PCT Filed: Oct. 26, 2018

(86) PCT No.: PCT/DE2018/100876
§ 371 (c)(1),
(2) Date: May 1, 2020

(87) PCT Pub. No.: WO2019/086072
PCT Pub. Date: May 9, 2019

(65) Prior Publication Data
US 2020/0300006 A1 Sep. 24, 2020

(30) Foreign Application Priority Data
Nov. 3, 2017 (DE) ...................... 10 2017 125 719.5

(51) Int. Cl.
*E05B 81/16* (2014.01)
*E05B 81/86* (2014.01)
*E05B 81/88* (2014.01)
*E05B 81/90* (2014.01)
*E05B 83/40* (2014.01)
*E05B 85/10* (2014.01)

(52) U.S. Cl.
CPC .............. *E05B 81/16* (2013.01); *E05B 81/86* (2013.01); *E05B 81/88* (2013.01); *E05B 81/90* (2013.01);
(Continued)

(58) Field of Classification Search
CPC .......... E05B 81/16; E05B 81/86; E05B 81/88; E05B 81/90; E05B 83/40; E05B 85/10;
(Continued)

(56) References Cited

U.S. PATENT DOCUMENTS 6,809,630 B1* 10/2004 Dreimann ............... E05B 85/10
340/5.62
9,518,408 B1* 12/2016 Krishnan ................ E05B 81/80
(Continued)

FOREIGN PATENT DOCUMENTS

DE 102006002119 A1 7/2006
DE 102005054111 A1 5/2007
(Continued)

OTHER PUBLICATIONS

Translation of International Search Report dated Feb. 5, 2019 for PCT/DE2018/100876.

*Primary Examiner* — Mark A Williams
(74) *Attorney, Agent, or Firm* — Renner, Otto, Boisselle & Sklar, LLP

(57) ABSTRACT

An emergency actuating device for a closing system of a movable part of a vehicle, in particular of a door, sliding door, flap or tailgate, having at least one energy store, a communication unit for wireless communication with an ID transponder, and an electronics unit for activating a lock of the movable part, whereby the lock of the movable part can be transferred from a locking position into an unlocking position or vice versa.

18 Claims, 2 Drawing Sheets

(52) U.S. Cl.
CPC .............. *E05B 83/40* (2013.01); *E05B 85/10*
(2013.01); *E05Y 2201/244* (2013.01); *E05Y
2201/248* (2013.01); *E05Y 2201/42* (2013.01);
*E05Y 2400/66* (2013.01); *E05Y 2800/11*
(2013.01); *E05Y 2900/531* (2013.01); *E05Y
2900/546* (2013.01)

(58) Field of Classification Search
CPC ......... E05Y 2201/244; E05Y 2201/248; E05Y
2201/42; E05Y 2400/66; E05Y 2800/11;
E05Y 2900/531; E05Y 2900/546
See application file for complete search history.

(56) References Cited

U.S. PATENT DOCUMENTS

| | | | | |
|---|---|---|---|---|
| 9,666,004 | B2 * | 5/2017 | Cumbo | ................... E05B 81/08 |
| 9,725,069 | B2 * | 8/2017 | Krishnan | ................ E05B 77/00 |
| 9,845,071 | B1 * | 12/2017 | Krishnan | ............. G07C 9/0069 |
| 10,137,857 | B1 * | 11/2018 | Siddiqui | ............... B60R 25/255 |
| 10,329,823 | B2 * | 6/2019 | Khan | ...................... E05F 15/46 |
| 10,422,166 | B2 * | 9/2019 | Papanikolaou | ........ H02N 2/186 |
| 10,449,931 | B2 * | 10/2019 | Mueller | .................. B60R 25/40 |
| 10,526,821 | B2 * | 1/2020 | Krishnan | ................ E05B 81/80 |
| 2016/0145910 | A1 * | 5/2016 | Beck | ....................... E05B 17/14 |
| | | | | 292/336.3 |

FOREIGN PATENT DOCUMENTS

| | | | | |
|---|---|---|---|---|
| DE | 202016102459 | U1 | 7/2016 | |
| DE | 102016005342 | A1 * | 11/2016 | ........... B60R 25/248 |
| DE | 102016005342 | A1 | 11/2016 | |
| EP | 1564689 | A2 * | 8/2005 | ........... B60R 25/246 |
| EP | 1564689 | A2 | 8/2005 | |
| EP | 3217365 | A1 * | 9/2017 | ......... G07C 9/00309 |
| JP | H08189238 | A | 7/1996 | |
| JP | 2006152676 | A | 6/2006 | |
| WO | 0123695 | A1 | 4/2001 | |
| WO | WO-2019086072 | A1 * | 5/2019 | .............. B60R 25/24 |

* cited by examiner

EMERGENCY ACTUATING DEVICE FOR A MOVABLE PART OF A VEHICLE

FIELD OF INVENTION

The invention relates to an emergency actuating device for a closing system of a movable part of a vehicle, a closing system for emergency actuation and a method for emergency actuation.

BACKGROUND OF INVENTION

There is an increasing demand in the case of current closing systems for vehicles to use electromechanical closing systems in which the lock cylinder is dispensed with and the locks are merely activated electronically. In this case the access to the vehicle or the access to parts of the vehicle can normally be produced by means of a conventional wireless key. This transmits and receives authorization signals, so that the lock is unlocked in the event of positive authentication.

Problems with the previously described closing systems occur when the wireless key has been lost or damaged in an emergency situation. Furthermore, it is not possible for the user to gain access to his vehicle when the complete vehicle is currentless. Then neither an authorization request nor unlocking can take place and the user is directed to external help.

DE 10 2016 005 342 A1 discloses an electronic closing system, in which electrical energy can be wirelessly transmitted by an ID transponder which can be carried by the user to an electric emergency battery of the closing system. The transmitted electrical energy charges the emergency battery of the closing system, so that an authentication can be carried out with the control unit of the vehicle if sufficient energy could be made available.

A disadvantage of the closing system known from the prior art is that sufficient energy must be present in the key and on the vehicle so that both the control unit of the vehicle and actuators can be supplied for unlocking.

SUMMARY OF INVENTION

An object of the present invention is to at least partially overcome the disadvantages known from the prior art. In particular it is an object of the invention to provide an emergency actuating device which enables locking and/or unlocking of a movable part of a vehicle when the vehicle or the vehicle electronics is substantially currentless.

The object is achieved by an emergency actuating device according to the present disclosure, a closing system according to the present disclosure and a method according to the present disclosure.

Further features and details of the invention are apparent from description and the drawings. In this case features and details which have been described in connection with the device according to the invention also of course apply in connection with the motor vehicle according to the invention, and/or the method according to the invention and vice versa in each case so that, always with respect to the disclosure, reference is made or can be made alternately to the individual aspects of the invention.

According to the invention an emergency actuating device is proposed for a closing system of a movable part of a vehicle, in particular a door, sliding door, flap or tailgate. The emergency actuating device has an energy store, in particular an electrical energy store, a communication unit for wireless communication with an ID transponder, and an electronics unit for activating a lock of the movable part, whereby the lock can be transferred from a locking position into an unlocking position or vice versa. Furthermore, an actuating element is provided which can be reached from outside the vehicle, so that the closing system can be switched into an emergency actuation mode by a user, and in the emergency actuation mode the communication unit can be brought into signal communication with the ID transponder, so that an authentication signal can be transmitted and, in the event of positive authentication, the electronics unit transfers the lock from a locking position into an unlocking position or vice versa.

Due to the configuration according to the invention a user can gain access to the movable part even when the vehicle is currentless.

Within the context of the invention a movable part may be understood to be a door, sliding door, flap or tailgate. This also includes flaps or doors in or on the vehicle as well as hoods, for example engine hoods. In this case flaps should also be understood to be, for example, a glove box or a stowage compartment inside the vehicle or stowage compartments that are accessible from the exterior.

If within the context of the invention reference is made to a lock for a motor vehicle, this covers all closing systems which fix a movable part in a position relative to the motor vehicle. A lock may be arranged, for example, in a side door, a sliding door, a flap, a cover but also, for example, in a rear seat. In particular, a lock may be arranged everywhere where movable parts are used by means of a closing system consisting of a locking mechanism and a catch.

The energy store according to the invention serves in particular for supplying the emergency actuating device with electrical and/or mechanical energy. In particular in the case of an electrical energy store an energy management system can be provided, by means of which for example the state of charge can be determined.

A communication unit according to the invention serves as a transmitting and/or receiving unit for wireless communication with an ID transponder. Thus the communication unit can receive and/or transmit data, in particular for authentication.

Within the meaning of the invention an ID transponder may be designed, for example, as a portable wireless key, key fob, smartphone, smart watch or similar smart device that is portable by the user. In this case the ID transponder has at least one transmitting and/or receiving unit, so that a wireless communication with the communication unit is feasible.

The electronics unit according to the invention serves for activating the lock of the movable part. Accordingly the electronics unit is in signal communication with the communication unit or includes the communication unit. Furthermore, the electronics unit is in signal communication with the lock or with a lock drive assigned to the lock. The electronics unit has a logic for managing the access to the movable part. If the closing system is set to an emergency actuation mode, access by the electronics unit can be controlled.

It is an essential feature of the invention, amongst other things, that an actuating element is provided, so that the closing system can be switched by a user into an emergency actuation mode. This means that, by means of an actuation of the actuating element by the user from outside the vehicle, a signal connection of the communication unit with the ID transponder is made possible, even if the vehicle is currentless. The emergency actuating device has an idle mode, in which no control of the closing system takes place and thus substantially no energy from the energy store is consumed. The emergency actuating device is only activated by the user actuating the actuating element and enabling locking and/or unlocking of the lock, even when the vehicle is currentless. Actuation can take place mechanically and/or electrically within the context of the invention. Thus, it can be provided that the user actuates an externally accessible switch, for example a microswitch, or an external current source is used for actuation. The energy store of the emergency actuating device is thus only required/activated when the user has actuated the actuating element and the closing system is transferred into an emergency actuation mode. Therefore, an external current source is not absolutely necessary.

In the emergency actuation mode the energy store can be used so that at least the electronics unit, the communication unit, the lock and/or a lock drive can be supplied with electrical energy. As long as the emergency actuation mode is not activated, substantially no energy or no energy from the energy store is consumed. In fact it is conceivable that in normal operation of the vehicle, that is to say in the presence of electrical energy in the vehicle, the energy store can be charged, but no energy is consumed/requested.

Furthermore, it is conceivable that the emergency actuating device is at least partially integrated in the lock. It is likewise conceivable that the emergency actuating device has a housing and is arranged in or on the movable part or on the vehicle. The emergency actuating device is preferably arranged on or in the region of the lock.

An energy connection is provided, wherein the energy connection is arranged at a location on the vehicle which is accessible by a user from the exterior, so that an emergency current supply to the emergency actuating device with an external energy source is possible. The energy connection can preferably be arranged behind a cap for the lock cylinder. The cap can also be present when no lock cylinder is provided. Thus this is a cover in the region of the door handle. It is conceivable that the energy connection is integrated into the actuating element. Accordingly the energy connection can be used to activate the closing system and thus to switch into the emergency actuation. The energy connection can be designed as an electrical contact, for example for a battery. Furthermore, it is conceivable that electrical energy can be transmitted wirelessly.

Within the context of the invention the communication unit can transmit, i.e. send and/or receive, energy and/or the data electromagnetically and/or inductively and/or capacitively and/or optically. In this connection the principle of cable-free transmission can relate to all electromagnetic transmission methods and transmitted frequencies which can pass through gas/vacuum sections or through respectively used insulation materials without specific transmission lines or media. For example, the use of near field communication techniques such as infrared diodes, NFC and IR LEDs. Such component can also always be part of integrated components. There are also components which can act both as LEDs (or laser sources or broadband sources) and as photodiodes, for example bidirectional chips or special LEDs. The photo-optical range up to UV is also a possible frequency range for components having a diode-like functional principle. Other photodetectors and emitters for UV/IS/IR are also conceivable within the context of the invention. If the energy connections according to the invention are used both for transmission of the electrical energy and also for data transmission, this may involve, for example, a carrier frequency system by which a data signal to or from the connected device is modulated into a high-frequency range and a data signal from or to the second transponder is demodulated. In this case both a unilateral/unidirectional and also a bidirectional transmission of the energy and/or the data is conceivable.

Within the context of the invention it is conceivable that the first transponder and the second transponder have a data interface for the data, in which Bluetooth and/or NFC and/or wireless LAN and/or GSM is/are used for the transmission of the data. The use of Bluetooth enables a fast and flexible connection between the battery and an external device, which external device can also be a user's mobile telephone. The stability of Bluetooth connections has proven itself to be very high due to the frequent frequency shifts and small data packets. Furthermore, Bluetooth is characterized by the low power consumption as well as the low transmission power and a low susceptibility to interference. The transmission by means of NFC (near field communication) makes possible a reliable and convenient transmission of the data from the battery to an external device, the reliability being increased by the fact that transmission is enabled only over a small distance and manipulation by third parties can be prevented thereby.

It may be advantageous that the energy store is designed as an electrical energy store, as an electrochemical energy store and/or electrostatic energy store, for example a battery. Likewise it is conceivable to provide a mechanical energy store. In this case the battery can be arranged in the ID transponder and/or on the vehicle. In particular, it is conceivable to provide an electromechanical generator, for example in the form of a dynamo or control wire. In this case a dynamo can be operatively connected to a mechanical door handle, so that by a pulling and/or pushing movement (handle movement) of the door handle a dynamo is operated, so that electrical energy can be generated. Likewise, it is conceivable to provide a spring mechanism or a pressurized container, which can carry out an actuation of the lock from an unlocking position into a locking position or vice versa.

Furthermore, the object is achieved by means of a closing system. The closing system for a movable part of a vehicle, in particular for a door, sliding door, flap or tailgate, has an emergency actuating device according to the invention. Accordingly, for the closing system according to the invention the same advantages and properties are produced as those described above in connection with the emergency actuating device according to the invention, and in each case vice versa. Furthermore, the closing system according to the invention has at least one lock for the movable part and a handle, which is accessible from outside the vehicle and can be arranged on the vehicle, for actuation of the emergency actuating device and/or of the lock.

A lock for the movable part is arranged on or in the movable part or on the vehicle. Within the context of the invention a handle may be an outer door handle, an electromechanical push button or lever.

The handle serves for the user to actuate the door, in particular the lock, and to actuate the emergency actuating device if the vehicle is currentless. Accordingly, the user can operate the handle from outside of the vehicle and the actuating element of the emergency actuating device is actuated thereby. Advantageously, the actuating element may accordingly be operatively connected to the handle.

A particular advantage results from the fact that the user must actuate the handle and therefore the actuating element for a determined time window, so that the closing system is switched into an emergency actuation mode. Thus, for example, the emergency actuation mode can be activated only in the event of actuation for more than 3 seconds. This prevents activation of the emergency actuation mode and discharge of the energy store in normal use of the handle.

It can be advantageous that the actuating element is integrated in the handle or is arranged on the handle. Particularly preferably, the actuating element is designed as a microswitch and can be actuated/triggered accordingly by actuation of the handle. It is conceivable that the actuating element is designed as an energy connection on or in the handle. The energy connection is preferably arranged in the region of the handle in which a lock cylinder is usually arranged. In this case, the energy connection can be arranged in an accommodating housing of the lock cylinder or in a covering cap of the lock cylinder.

Furthermore, it can be advantageous if the handle has an accommodating housing for an ID transponder, in which the ID transponder can be at least partially arranged. In this case, it may be particularly advantageous that the actuating element is arranged in the region of the accommodating housing. Accordingly, the actuating element can be actuated by insertion of the ID transponder into the accommodating housing. Thus, for example, a microswitch can be actuated by the ID transponder and the closing system can thus be switched into the emergency actuation mode. In addition, data and/or current can be transmitted from the ID transponder to the emergency actuating device. Thus an authentication between ID transponder and communication unit can be produced, in particular by means of near field communication.

According to the invention, the object of the invention is also achieved by a method. The method serves for emergency actuation of a closing system according to the invention for a movable part of a vehicle. Accordingly, all the advantages and properties already described above in connection with the closing system according to the invention are produced for the method according to the invention.

The method comprises at least the following steps:
a) actuating an actuating element on a vehicle, so that the closing system is switched into an emergency actuation mode,
b) activating an energy store, so that at least one communication unit is supplied with electrical energy,
c) establishing a wireless signal connection to an ID transponder carried by the user,
d) transmitting at least one authentication signal from the ID transponder to the communication unit and/or vice versa,
e) unlocking or locking a lock of the movable part when a positive authentication has taken place.

In this case, the method steps can proceed at least in part simultaneously or successively, and the order of the method steps is not limited to the order defined by the numbering, so that individual steps can be carried out in a different order.

It is conceivable according to the invention that the actuation of the actuating element takes place mechanically, in particular for a duration of T>2.5 sec, preferably between 3 sec and 10 sec, particularly preferably between 5 sec and 7 sec.

It may be advantageous that the actuation takes place electrically by means of an external energy source or by means of electrical short-circuit. An external energy source makes it possible to switch the closing system into the emergency actuation mode to be switched even if the energy store of the emergency actuating device is empty. Then electrical energy can be fed in, for example by means of an external battery, and actuation and thus setting to the emergency actuation mode can take place. Furthermore, actuation can take place by short-circuiting of an electrical contact. In this case, it is conceivable that a device by means of which a short-circuit of the energy connection can be carried out on the covering cap of the door lock cylinder.

Within the context of the invention it is conceivable that authentication takes place by means of a smart device, for example a smartphone or smartwatch, whereby by means of software on the device the operator is given an instruction as to how emergency actuation of the closing system takes place. Accordingly, it is conceivable that information about the operating procedure is displayed or output for the user by means of his smartphone or his smartwatch. Thus the operation is made considerably simpler. In particular in an emergency and with the vehicle closed, the operator can find out how he can restore access.

BRIEF DESCRIPTION OF DRAWINGS

The invention is explained in greater detail below with reference to the appended drawings based on several preferred exemplary embodiments. However, it is again pointed out that an embodiment of the invention is not limited to the illustrated exemplary embodiments, but these merely constitute advantageous embodiments. The illustrated features can be advantageously implemented individually or in combination with further features of the description and also the claims individually or in combination. In this case, it should be noted that the drawings are only descriptive and are not intended to restrict the invention in any way.

In the following embodiments identical or equivalent elements are designated by identical reference numerals and double description is at least partially avoided.

In the drawings:

Figure 1:
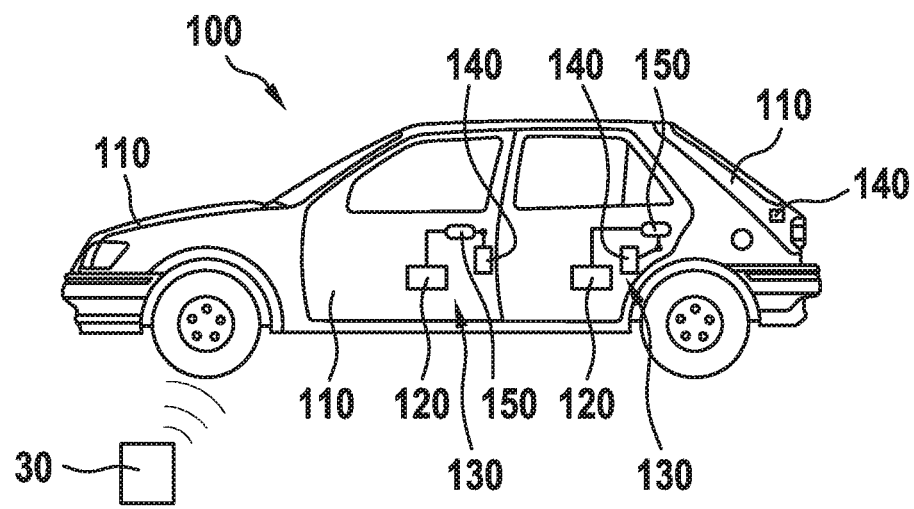
Figure 2:
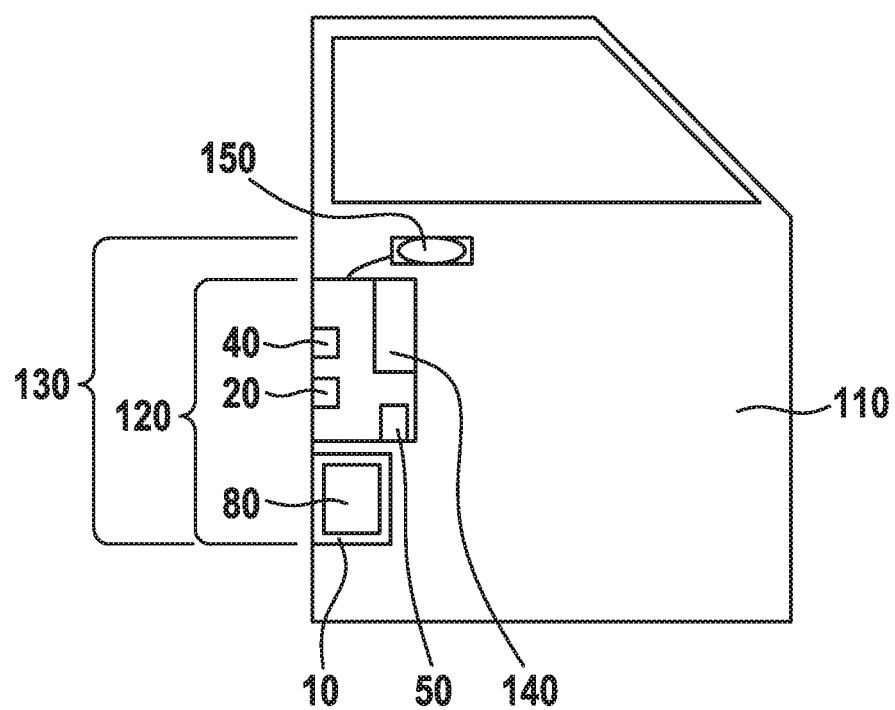
Figure 3:
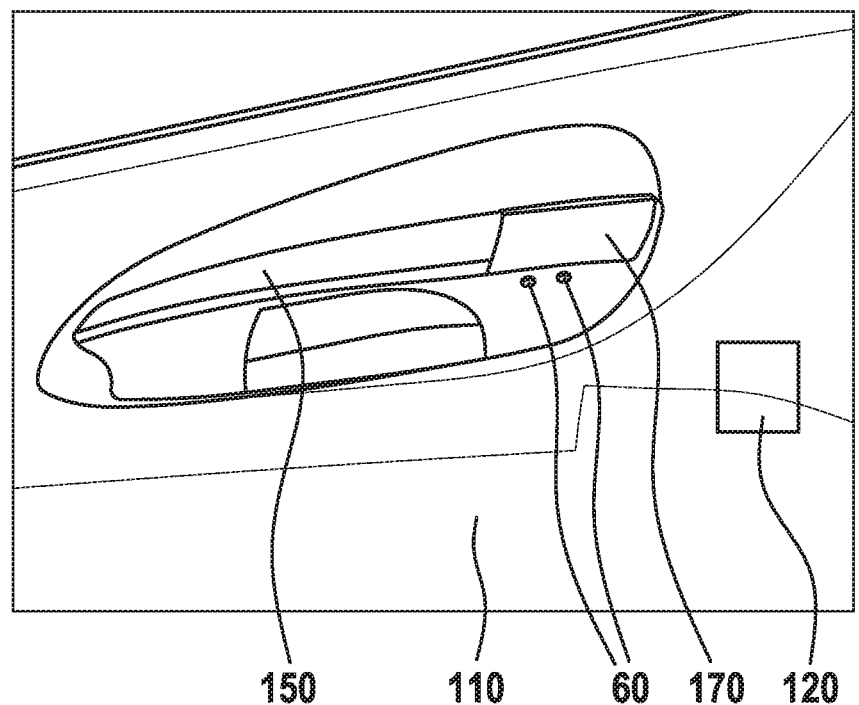
Figure 4:
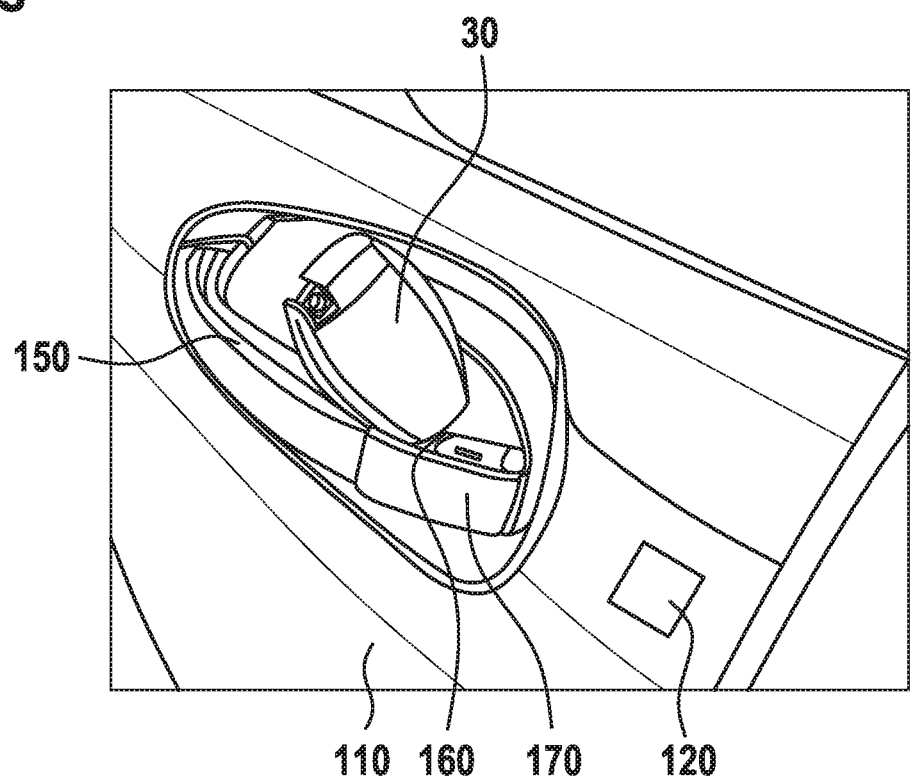

FIG. 1 shows a vehicle with a possible embodiment of a closing system according to the invention having a possible embodiment of an emergency actuating device according to the invention, FIG. 2 shows a movable part of a vehicle with a possible embodiment of a handle for a closing system according to the invention, FIG. 3 shows a detail of a movable part with a possible embodiment of an emergency actuating device according to the invention and a handle and, FIG. 4 shows a detail of a movable part with a possible embodiment of an emergency actuating device according to the invention and a handle.

DETAILED DESCRIPTION

FIG. 1 shows a vehicle 100 with a possible embodiment of a closing system 130 according to the invention having a possible embodiment of an emergency actuating device 120 according to the invention. In this case the vehicle 100 is shown by way of example with the movable parts in the form of side doors 110, engine hood 110 and tailgate 110. Within the context of the invention a closing system 130 according to the invention having an emergency actuating device 120 according to the invention can be assigned to each movable part 110 of the vehicle 100. Furthermore, it is conceivable that only a central closing system 130 is provided and unlocking and/or locking can be carried out by means of a central locking system of the vehicle 100 in combination with the closing system 130.

The closing system 130 has an emergency actuating device 120, a handle 150 and a lock 140. Within the context of the invention a handle 150 can be designed, for example, as a door handle, push button, tailgate handle or hood opener.

In order to lock and/or unlock the vehicle, in particular a movable part 110 thereof, when the vehicle is currentless and therefore an electromechanical lock 140 can no longer be locked and/or unlocked in a conventional manner, according to the invention the method can make this possible by the following steps:

a) actuating an actuating element 50 on a vehicle 100, so that the closing system 130 is switched into an emergency actuation mode, b) activating an energy store 10, so that at least one communication unit 20 is supplied with electrical energy, c) establishing a wireless signal connection to an ID transponder 30 carried by the user, d) transmitting at least one authentication signal from the ID transponder 30 to the communication unit 20 and/or vice versa, e) unlocking or locking a lock 140 of the movable part 110 when a positive authentication has taken place.

FIG. 2 shows a movable part 110 in the form of a side door of a vehicle. The side door has a possible embodiment of a closing system 130 according to the invention having a possible embodiment of an emergency actuating device 120 according to the invention.

The emergency actuating device 120 has an energy store 10, in particular an electrical energy store, a communication unit 20 for wireless communication with an ID transponder, and an electronics unit 40 for activating a lock 140 of the movable part 110, whereby the lock 140 can be transferred from a locking position into an unlocking position or vice versa. Furthermore, an actuating element 50 is provided which can reached from outside the vehicle, so that the closing system 130 can be switched into an emergency actuation mode by a user, and in the emergency actuation mode the communication unit 20 can be brought into signal communication with the ID transponder, so that an authentication signal can be transmitted and, in the event of positive authentication, the electronics unit 40 transfers the lock 140 from a locking position into an unlocking position or vice versa.

Due to the configuration according to the invention a user can gain access to the movable part 110 and thus to the vehicle even when the vehicle is completely currentless. The energy store 10 is activated or woken up by the actuation of the actuating element 50, so that electrical energy can be transmitted at least to the communication unit 20, preferably also on the lock 140 or a lock drive.

Actuation can take place mechanically and/or electrically within the context of the invention. Thus, it can be provided that the user actuates a switch which is accessible from outside as an actuating element 50, e.g. a microswitch, or uses an external current source for actuation. The energy store 10 of the emergency actuating device 120 is thus only required when the user has actuated the actuating element 50 and the closing system 130 is transferred into an emergency actuation mode. Therefore, an external current source is not absolutely necessary.

In the emergency actuation mode the energy store 10 can be used so that at least the electronics unit 40, the communications unit 20, the lock 140 and/or a lock drive can be supplied with electrical energy. As long as the emergency actuation mode is not activated, substantially no energy from the energy store 10 is consumed. In fact it is conceivable that in normal operation of the vehicle, that is to say in the presence of electrical energy, the energy store 10 can be charged.

As shown in FIG. 2, the emergency actuating device 120 can be at least partially integrated into the lock 140 or arranged directly on the lock 140. It is conceivable that the emergency actuating device 120 is at least partially integrated into a lock housing. It is likewise conceivable that the emergency actuating device 120 has a housing and is arranged in or on the movable part 110 or on the vehicle. The emergency actuating device 120 is preferably arranged on or in the region of the lock 140. The electrical energy store 10 has an energy management system 80 by means of which, for example, the state of charge of the energy store 10 can be determined.

FIG. 3 shows a detail of a movable part 110 having a handle 150 in the form of a door handle. In this case, the handle 150 is arranged movably on the movable part 110. Moreover, the handle 150 has a cover 170. A lock cylinder is usually arranged under the cover. According to the invention an energy connection 60 can be arranged behind and/or in or on the cover 170. In FIG. 3 the energy connection 60 is integrated in the cover 170 in such a way that access from the exterior is easily possible. An external energy store 70 can be connected to the energy connection 60 and can supply electrical energy to the closing system or at least the emergency actuating device 120.

FIG. 4 shows a further possible embodiment of a handle 150. The handle 150 is likewise designed as a handle and has a cover 170. An accommodating housing 160 is arranged in the cover 170, and an ID transponder 30 can be at least partially inserted into the accommodating housing 160. Thus, an actuating element in the accommodating housing 160 can be actuated and the emergency actuation mode can be activated. Furthermore, in the inserted position of the ID transponder 30, communication with the communication unit of the emergency actuating device 120 can be reliably achieved. Furthermore, it is conceivable for data and/or electrical energy to be transmitted from the ID transponder 30 to the emergency actuating device 120.

The preceding explanation of the embodiments describes the present invention exclusively in the context of examples. Of course individual features of the embodiments can be freely combined with one another, if technically practical, without departing from the scope of the present invention.

LIST OF REFERENCES 10 energy store
20 communication unit
30 ID transponder
40 electronics unit
50 actuating element
60 energy connection
70 external energy store
80 energy management
100 vehicle
110 movable part
120 emergency actuating device
130 closing system
140 lock
150 handle
160 accommodating housing
170 cover

The invention claimed is:

1. An emergency actuating device for a closing system of a movable part of a vehicle, the emergency actuating device comprising:

at least one energy store, wherein during a normal operation of the vehicle in which an emergency actuation mode is not activated, the at least one energy store is charged by presence of electrical energy generated by the vehicle and the at least one energy store stores energy from the charging, a communication unit for wireless communication with an ID transponder, an electronics unit for activating a lock of the movable part, wherein the lock of the movable part can be transferred between a locking position and an unlocking position, an actuating element which is engageable from outside the vehicle by a user, wherein the closing system can be switched into the emergency actuation mode by the user engaging the actuating element, wherein in the emergency actuation mode, the energy in the at least one energy store is discharged such that the communication unit can be powered to be brought into signal communication with the ID transponder whereby an authentication signal can be received by the communication unit from the ID transponder and, if the authentication signal indicates a positive authentication, the electronics unit transfers the lock between the locking position and the unlocking position.

2. The emergency actuating device according to claim 1 further comprising an energy connection and an external energy store that is external to an interior of the vehicle and connected to the energy connection, wherein the energy connection is arranged at a location on the vehicle which is accessible by the user from outside the vehicle, wherein an emergency current is supplied to the emergency actuating device with the external energy store by way of the connection to the energy connection.

3. The emergency actuating device according to claim 1, wherein energy and/or data can be transmitted electromagnetically and/or inductively and/or capacitively and/or optically by the communication unit to the ID transponder.

4. The emergency actuating device according to claim 1, wherein the energy store is an electrochemical energy store or a mechanical energy store.

5. A closing system for a movable part of a vehicle that is a door, sliding door, flap or tailgate, having an emergency actuating device according to claim 1, further comprising at least one lock for the movable part and a handle which is accessible from outside the vehicle and can be arranged on the vehicle for actuation of the emergency actuating device and/or of the lock.

6. The closing system according to claim 5, wherein the actuating element of the emergency actuating device is arranged on the handle, and the actuating element includes a microswitch and/or an energy connection.

7. The closing system according to claim 5, wherein the handle has an accommodating housing for the ID transponder, in which the ID transponder can be at least partially arranged, the actuating element being arranged on the accommodating housing.

8. A method for emergency actuation of a closing system for a movable part of a vehicle, having the features of claim 5, the method comprising:
a) actuating the actuating element on the vehicle, so that the closing system is switched into the emergency actuation mode,
b) activating the at least one energy store, so that the communication unit is supplied with electrical energy,
c) establishing a wireless signal connection to the ID transponder carried by the user,
d) transmitting at least one authentication signal between the ID transponder and the communication unit,
e) unlocking or locking the lock of the movable part when the positive authentication has taken place.

9. The method according to claim 8 further comprising actuating the actuating element mechanically for a duration that is greater than 2.5 seconds.

10. The method according to claim 8 further comprising actuating the actuating element electrically by an external energy store or by an electrical short-circuit.

11. The method according to claim 9 further comprising actuating the actuating element for the duration that is between 3 and 10 seconds.

12. The method according to claim 11 further comprising actuating the actuating element for the duration that is between 5 and 7 seconds.

13. The emergency actuating device according to claim 1, wherein the at least one energy store is activated by actuation of the actuating element for transmitting electrical energy to at least one of the communication unit and the lock.

14. The emergency actuating device according to claim 1, wherein the emergency actuating device is arranged on or in a region of the lock.

15. The emergency actuating device according to claim 1, wherein the at least one energy store includes an energy management system to determine a state of energy of the at least one energy store.

16. The emergency actuating device according to claim 1, wherein the emergency actuating device has an idle mode in which no energy from the at least one energy store is consumed.

17. The emergency actuating device according to claim 2, wherein the energy connection is a battery.

18. The closing system according to claim 5 further comprising at least one transmitting and/or receiving arrangement arranged in the ID transponder and configured for wireless communication with the communication unit.

* * * * *